United States Patent [19]

Leiber

[11] Patent Number: 4,559,777
[45] Date of Patent: Dec. 24, 1985

[54] POWER STEERING APPARATUS WITH AT LEAST ONE ADDITIONAL HYDRAULIC LOAD CONNECTED TO IT

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 586,624

[22] Filed: Mar. 6, 1984

[30] Foreign Application Priority Data

May 28, 1983 [DE] Fed. Rep. of Germany ....... 3319408

[51] Int. Cl.⁴ .............................................. F16D 31/02
[52] U.S. Cl. .......................................... 60/422; 91/29; 91/517; 60/547.2
[58] Field of Search ...................... 91/29, 33, 517, 518; 60/547.2, 421, 422; 180/132

[56] References Cited

U.S. PATENT DOCUMENTS

| 2,941,475 | 6/1960 | Blair | 417/238 |
| 3,579,987 | 5/1971 | Busse | 60/422 |
| 3,760,689 | 9/1973 | Johnston | 91/518 X |
| 3,994,133 | 11/1976 | Pfeil et al. | 60/422 |
| 4,044,786 | 8/1977 | Yip | 60/421 X |
| 4,057,073 | 11/1977 | Adams | 60/422 X |

FOREIGN PATENT DOCUMENTS 624653 7/1961 Canada .................................. 60/422

Primary Examiner—Edward K. Look
Attorney, Agent, or Firm—Edwin E. Greigg

[57] ABSTRACT

A power steering apparatus with a pressure supply for additional loads, the steering pump of which has a plurality of feed chambers separate from one another. The additional loads, such as a brake booster and/or a level regulating device, are connected to one of these separate feed chambers. A reversing valve enables a greater supply capacity to the steering gear by shutting off the additional loads.

10 Claims, 2 Drawing Figures

4,559,777

POWER STEERING APPARATUS WITH AT LEAST ONE ADDITIONAL HYDRAULIC LOAD CONNECTED TO IT

BACKGROUND OF THE INVENTION

The invention relates to a power steering apparatus with at least one additional hydraulic load connected to it, such as a hydraulic brake booster and/or a hydraulic level regulating device.

A power steering apparatus having a brake booster as the additional load, a reservoir charging valve disposed in the pressure circuit of the power steering is used to supply the brake booster has been set forth in a copending application Ser. No. 550,144 filed Nov. 9, 1983. A reservoir charging valve of this kind calls attention to itself in a disadvantageous way whenever, as a result of charging the brake pressure reservoir in the brake booster, there is an additional consumption of power at a time when the power steering requires full power, for instance when parking. Also, specialized pressure translating means are needed when supplying further consumers with a different pressure level.

OBJECT AND SUMMARY OF THE INVENTION

The power steering apparatus with additional hydraulic loads connected to it has the advantage over the prior art that because of the separate feed chamber for the additional loads, such a high pressure level can be established in the load circuit that pressure translating means between the feed chamber and the additional load are unnecessary. Supplying the additional loads via the separate feed chamber prevents a noticeable power drop in the power steering when the additional loads are being supplied at the same time.

As a result of the reversing valve according to the invention, the process of supplying the loads can be interrupted and the separate feed chamber additionally used to meet the power needs of the power steering. As a result, the steering pump can be designed in a smaller overall size.

The power steering apparatus with a power supply of additional loads can be used in particularly optimal fashion whenever a first additional consumer is embodied by a brake booster, which for separating hydraulic oil and brake fluid is coupled to the power steering circuit via a fluid-medium tranferring means, and a second additional consumer is embodied by a level regulating device.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
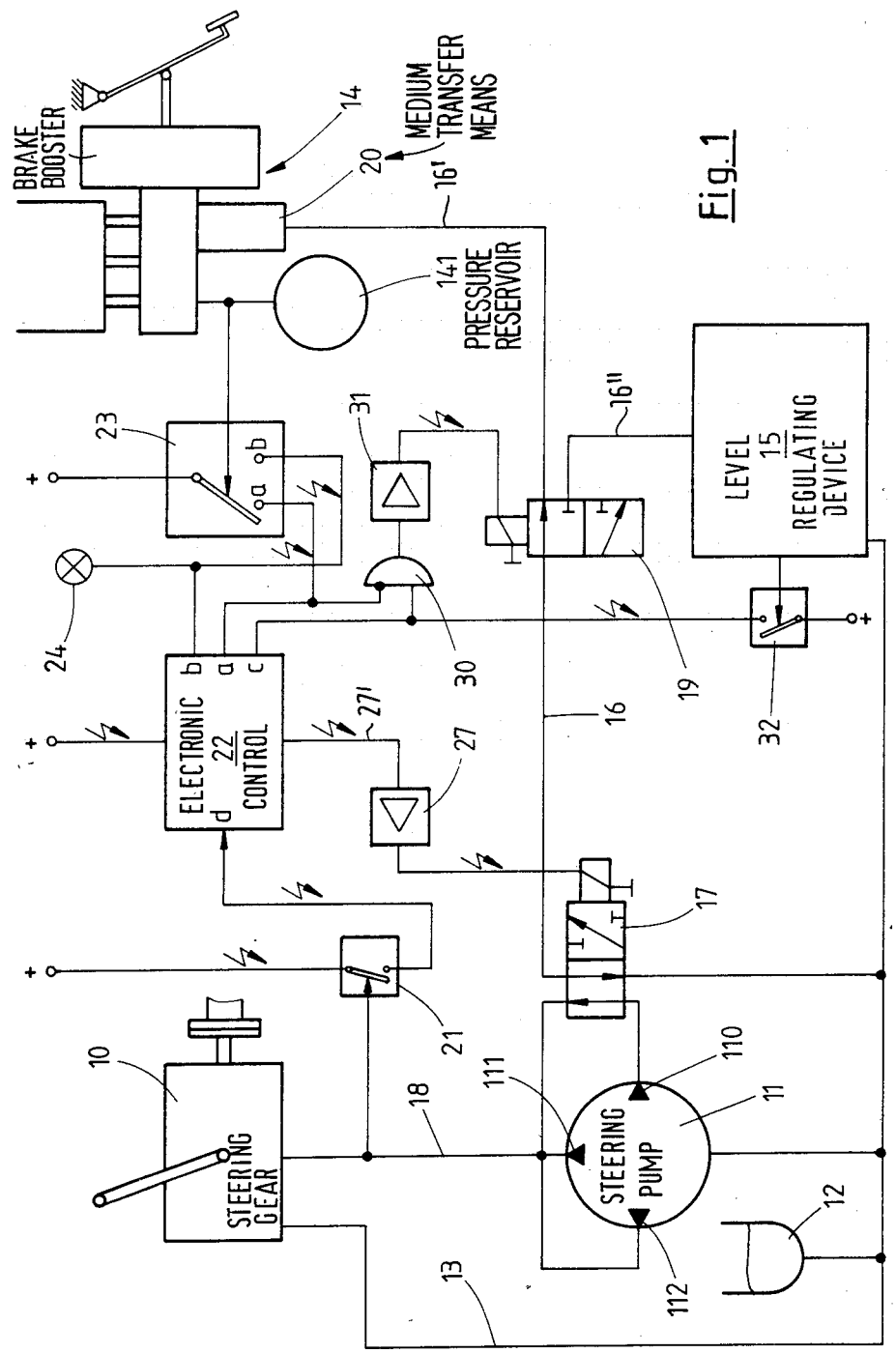
FIG. 1 is a block circuit diagram for a power steering apparatus having two additional consumers for a motor vehicle.

The power steering apparatus shown schematically in FIG. 1 has a steering gear 10, a steering pump 11 and a hydraulic oil container 12. The steering pump 11 feeds hydraulic oil in a known manner from the hydraulic container 12 to the steering gear 10, from whence the hydraulic oil flows back to the hydraulic oil container 12 via a return line 13.

The additional hydraulic consumers that are to be supplied along with the power steering apparatus are embodied by a brake booster 14 and a level regulating device 15. The steering pump 11 has a plurality of separate feed chambers, in this case, three, numbered 110, 111, 112. If the steering pump is embodied as a multiple-piston pump, then each feed chamber 110-112 is associated with its own feed piston. The brake booster 14 and the level regulating device 15 are connected via a supply line 16 to the feed chamber 110, with a reversing valve 17 in between as will be described later herein, while the two feed chambers 111 and 112 are connected to the hydraulic inflow 18 to the steering gear 10.

The electromagnetically actuated reversing valve 17 is embodied here as a 4/2-way magnetic valve. In its reversed working position as compared with the basic position shown in FIG. 1, the supply line 16 is connected to the feed chamber 110, while in the basic position of the reversing valve 17 shown in FIG. 1 this connection is interrupted, the supply line 16 is connected to the return line 13 to the hydraulic oil container 12 and the feed chamber 110 is additionally connected to the hydraulic inflow 18.

An electromagnetic sequence valve 19, here embodied as a 3/2-way magnetic valve, is incorporated into the supply line 16. In the basic position of the sequence valve 19 shown in FIG. 1, the supply line 16' is connected to allow passage through to the brake booster 14, while in the operating position of the sequence valve 19 the supply line 16' is connected to the level regulating device 15, while simultaneously blocking off the remaining supply line from the brake booster 14. To keep the hydraulic oil and the brake fluid separate, the supply line 16' is not connected directly to brake booster 14 but rather via a medium transferring means 20 which is connected to the brake booster 14, which assures the charging of the pressure reservoir 141 of the brake booster 14. To operate the medium transferring means, the reversing valve 17 is switched intermittently.

To assure that the supply priority will be in favor of the steering gear 10 instead of the consumers 14, 15, a pressure switch 21 is connected with the hydraulic inflow 18 to the steering gear 10. This pressure switch 21, which closes above a predetermined pressure value, assures that the reversing valve 17 always assumes its basic position shown in FIG. 1—and that the consumers 14, 15 are thereby disconnected—whenever the required supply pressure in the steering gear is above the predetermined pressure value. This is attained by means of an appropriate logic linkage, which is also contained in an electronic control unit 22 for triggering the reversing valve 17. This electronic control unit 22 is also supplied with the two outputs of a further pressure switch 23, which is connected to the brake booster 14 and ascertains the pressure in the pressure reservoir 141. In the switching position of the pressure switch 23 shown in FIG. 1, the pressure reservoir 141 is charged. If the pressure switch 23 closes its switch contact a, then the pressure in the pressure reservoir 141 has dropped to such an extent that recharging is necessary. The closing of switch contact b represents a warning position for turning on a warning light 24, which signals the insufficient supply of the brake booster 14.

Figure 2:
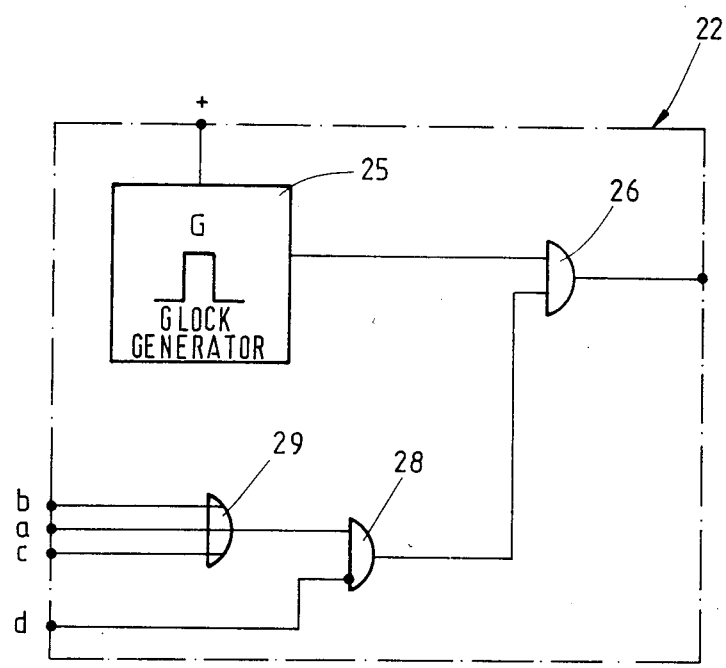
FIG. 2 is a circuit diagram of a control device for a reversing valve in FIG. 1.

The electronic control unit 22 shown in detail in FIG. 2 has a clock generator 25, which is connected via a gate element 26, here an AND gate, and an amplifier 27 via line 27' with the exciter winding of the reversing valve 17. The gate element 26 is controlled by an AND gate 28, the negative input of which is connected via the connection d with the pressure switch 21, and the other input of which is connected to the output of an OR gate 29. Two inputs of the OR gate 29 are connected with contacts a and b, respectively, of the pressure switch 23. By means of the clock generator 25, with the gate element 26 open, the reversing valve 17 is switched over intermittently into its two switching positions in order to operate the medium transferring means 20. The gate element 26 is opened until such time as the pressure switch 21 is opened and thus provides no signal indicating a need for pressure in the steering gear 10 below the predetermined pressure value, and whenever a control signal appears from the pressure switch 23 via the switch contact a or the switch contact b indicating a pressure level in the pressure reservoir 141 of the brake booster 14 that is below the predetermined pressure value and necessitates recharging. If the pressure switch 21 closes, for instance as a result of the pressure increase in the steering gear 10 brought about during parking, then the gate element 26 is blocked in every case, and the reversing valve, in its uncontrolled state, assumes the basic position shown in FIG. 1. The steering gear 10 is thus supplied with a higher priority than that of the consumers.

The level regulating apparatus 15 is supplied with a lower priority than the brake booster 14. To this end, the exciter winding of the sequence valve 19 is controlled by a logic linkage member 30, here an AND gate with a negative input, via an amplifier 31. The negative input of the linkage member 30 is connected with the output contact a of the pressure switch 23, while the other input of the logic linkage member 30 is connected to a further pressure switch 32, which is connected with the level regulating device 15 and closes whenever the pressure in this device 15 is below a predetermined pressure value. If the pressure reservoir 141 of the brake booster 14 is precharged to operating pressure, and the pressure switch 23 is thus opened—as shown in FIG. 1—then there is no signal present at the negative input of the logical linkage member 30. If the pressure in the level regulating device 15 now drops to such an extent that the pressure switch 32 closes, then a control signal appears at the output of the linkage member 30 which reaches the exciter winding of the sequence valve 19 via the amplifier 31 and switches the sequence valve 19 over into its working position. The brake booster 14 is thus disconnected from the supply line 16, and the level regulating device 15 is connected via the reversing valve 17 with the feed chamber 110. Since the output signal of the pressure switch 32 also reaches the third input of the OR gate 29 of the electronic control unit 22, then when the pressure switch 21 is opened the gate element 26 is opened, so that the reversing valve 17 is triggered.

The invention is not restricted to the exemplary embodiment described above. For instance, the steering gear 10 and the brake booster 14 may be operated with the same fluid. In that case, the medium transferring means 20 preceding the brake booster 14 is unnecessary; but it must be disposed preceding the level regulating device 15, which is still operated with hydraulic oil, efficaciously being located between the output of the sequence valve 19 and the input of the level regulating device 15. The level regulating device 15 is then provided with its own hydraulic oil container, and its connection with the fluid container 12 should be broken. This fluid container 12 may be combined with the supply container for the brake booster 14.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A power steering apparatus having at least a first hydraulic load connected to it, which comprises a steering gear and a steering pump connected therewith by a connecting line for supplying hydraulic oil to the steering gear, said steering pump has a plurality of feed chambers separate from one another, and that said first load is connected to one of the feed chambers of said steering pump by a connecting line, a reversing valve disposed in the connecting line between the steering pump and said first hydraulic load, said reversing valve including two switching positions which in one of said two switching positions of said reversing valve, the connecting line to the additional load is interrupted and one feed chamber of the steering pump is additionally connected with the steering gear, an electromagnetically sequencing valve connected in said connecting line between said reversing valve and said first hydraulic load, a second hydraulic load with a lower supply priority as compared with said first hydraulic load connected via said electromagnetic sequencing valve to said connecting line between the reversing valve and said first hydraulic load in which said sequencing valve in one of two switching positions disconnects said first hydraulic load from said connecting line and connects said second hydraulic load to said reversing valve, and said sequencing valve is controlled by a first pressure switch connected to said first load in such a manner that the sequencing valve assumes its switching position disconnecting said second load whenever a pressure in said first load is below a predetermined value, a second pressure switch connected with said second load in which said second pressure switch emits a sequencing signal for the sequencing valve whenever the pressure in the second load is below a predetermined value, and that the sequencing signal is logically linked with an output signal of said first pressure switch in such a manner that the sequencing signal reaches the sequencing valve only when the pressure in the first load is above the predetermined pressure value.

2. An apparatus as defined by claim 1, in which the steering pump is embodied as a multiple-piston pump having at least one separate feed piston for said hydraulic loads.

3. An apparatus as defined by claim 1, in which said first hydraulic load is embodied by a brake booster and said second hydraulic load is embodied by a level regulating device.

4. An apparatus as defined by claim 1, in which at least one of the additional loads is connected via a medium transferring means to the output of the reversing valve and that an electronic control unit is provided, which intermittently imposes exciting current upon the reversing valve in accordance with one of said position of the pressure switches.

5. An apparatus as defined by claim 4, in which the electronic control unit includes a clock generator, which is connected via a gate element and an amplifier with an exciter winding of the reversing valve, and that the gate element is controlled by an AND gate having one input of which is occupied by output signals of the second and/or third pressure switch and a negative, input of which is occupied by an output signal of the first pressure switch.

6. A power steering apparatus having at least a first hydraulic load connected to it, which comprises a steering gear and a steering pump connected therewith by a connecting line for supplying hydraulic oil to the steering gear, said steering pump includes a plurality of feed chambers separated from one another, and that the additional load is connected to one of the feed chambers of said steering pump by a connecting line with an electromagnetically actuated reversing valve disposed in the connecting line between the steering pump and said first hydraulic load, said electromagnetic actuated reversing valve including two switching positions which in one of said two switching positions of said electromagnetic actuated reversing valve, the connecting line to said first hydraulic load is interrupted and one feed chamber of the steering pump is additionally connected with the steering gear, said electromagnetically actuated reversing valve being controlled by a first pressure switch that communicates with a hydraulic inflow to the steering gear in such a manner that said electromagnetic actuated reversing valve assumes its switching position disconnecting said first hydraulic load from the steering pump whenever the pressure in the steering gear exceeds a predetermined value, an electromagnetically sequencing valve connected in said connecting line between said electromagnetic actuated reversing valve and said first hydraulic load, a second hydraulic load with a lower supply priority as compared with said first hydraulic load connected via said electromagnetic sequencing valve to said connecting line between said electromagnetic actuated reversing valve and said first hydraulic load in which said sequencing valve in one of two switching positions disconnects said first hydraulic load and connects said second hydraulic load to said electromagnetic actuated reversing valve, and said sequencing valve is controlled by a second pressure switch connected to said first hydraulic load in such a manner that said sequencing valve assume its switching position disconnecting said second hydraulic load whenever the pressure in said first hydraulic load is below a predetermined value, a third pressure switch connected with said second hydraulic load which third pressure switch emits a sequencing signal for said sequencing valve whenever the pressure in said second hydraulic load is below a predetermined value, and said sequencing signal is logically linked with an output signal of said second pressure switch in such a manner that said sequencing signal reaches said sequencing valve only when the pressure in said first hydraulic load is above the predetermined pressure value.

7. An apparatus as defined by claim 6, in which said first hydraulic load is embodied by a brake booster and said second hydraulic load is embodied by a level regulating device.

8. An apparatus as defined by claim 6, in which the steering pump is embodied as a multiple-piston pump having at least one separate feed piston for said hydraulic loads.

9. An apparatus as defined by claim 8, in which at least one of the additional loads is connected via a medium transferring means to the output of the reversing valve and that an electronic control unit is provided, which intermittently imposes exciting current upon the reversing valve in accordance with one of said position of the pressure switches.

10. An apparatus as defined by claim 9, in which the electronic control unit has a clock generator, which is connected via a gate element and an amplifier with the exciter winding of the reversing valve, and that the gate element is controlled by an AND gate, the one input of which is occupied by output signals of the second and/or third pressure switch and another, negative, input of which is occupied by the output signal of the first pressure switch.

* * * * *